United States Patent [19]

Nilssen

[11] Patent Number: 4,983,887
[45] Date of Patent: Jan. 8, 1991

[54] CONTROLLED SERIES-RESONANCE-LOADED BALLAST

[76] Inventor: Ole K. Nilssen, Caesar Dr., Barrington, Ill. 60010

[21] Appl. No.: 298,684

[22] Filed: Jan. 19, 1989

Related U.S. Application Data

[63] Continuation-in-part of Ser. No. 80,865, Aug. 13, 1987, Pat. No. 4,819,146.

[51] Int. Cl.⁵ .................... H05B 37/02; H05B 39/04; H05B 41/36
[52] U.S. Cl. .................................. 315/224; 315/307; 315/DIG. 7
[58] Field of Search ................. 315/DIG. 7, 224, 307, 315/DIG. 5, 219

[56] References Cited

U.S. PATENT DOCUMENTS

| | | | |
|---|---|---|---|
| 4,307,353 | 12/1981 | Nilssen | 363/133 X |
| 4,554,487 | 11/1985 | Nilssen | 315/224 |
| 4,581,562 | 4/1986 | Nilssen | 315/DIG. 7 X |
| 4,677,345 | 6/1987 | Nilssen | 315/DIG. 7 X |
| 4,692,667 | 9/1987 | Nilssen | 315/DIG. 7 X |
| 4,722,040 | 1/1988 | Ball | 315/DIG. 7 X |
| 4,763,239 | 8/1988 | Ball | 315/DIG. 7 X |
| 4,819,146 | 4/1989 | Nilssen | 315/DIG. 7 X |

*Primary Examiner*—Eugene R. Laroche
*Assistant Examiner*—Do Hyum Yoo

[57] ABSTRACT

A self-oscillating half-bridge inverter is powered from a DC voltage source and has a series-turned high-Q LC circuit connected across its output. A pair of fluorescent lamps is normally series-connected across the tank capacitor of the LC circuit. Whenever the lamp load is not so connected, the magnitude of the high-frequency current flowing through the LC circuit would tend to increase to destructively high levels. To prevent this from taking place, a negative feedback control circuit manifestly limits the magnitude of the high frequency current by reducing the forward conduction duty-cycle of each of the two bridge transistors whenever the peak current magnitude exceeds a pre-determined level. In particular, during normally loaded operation, each of the inverter's two transistors operate with a nearly 50% forward conduction duty-cycle. However, whenever the magnitude of the high frequency current exceeds a pre-determined level, the control circuit acts to shorten the forward conduction duty-cycle. As a result, with an unloaded high-Q series-tuned LC circuit connected across the inverter's output, the current through the LC circuit builds up to a certain level and remains there, thereby to provide a substantially fixed-magnitude output voltage suitable for properly starting the fluorescent lamps when they are connected. As soon as the lamps ignite, the resulting loading reduces the output voltage, thereby effectively removing the control circuit from operational involvement.

13 Claims, 1 Drawing Sheet

CONTROLLED SERIES-RESONANCE-LOADED BALLAST

RELATED APPLICATION

Instant application is a Continuation-in-Part of application Ser. No. 07/080,865 filed Aug. 3, 1987, now U.S. Pat. No. 4,819,146 issued on Apr. 4, 1989.

BACKGROUND OF THE INVENTION

1. The present invention relates to series-resonance-loaded inverters, particularly as used for powering gas discharge lamps.
2. Description of Prior Art In an inverter where a gas discharge lamp load is parallel-connected across the tank capacitor of a high-Q LC circuit that is resonantly series-excited by a high-frequency voltage output of the inverter, it is necessary to provide some means to protect against the high currents and voltages resulting due to so-called Q-multiplication whenever the lamp load is removed or otherwise fails to constitute a proper load for the LC circuit.

In U.S. Pat. No. 4,370,600 to Zansky, circuit protection is provided by way of providing to the LC circuit an alternative load in the form of a voltage-clamping means; which voltage-clamping means acts to load the LC circuit during any period when the lamp does not constitute a proper load therefor.

The voltage-clamping is accomplished by rectifying the Q-multiplied voltage output of the LC circuit and by applying the resulting DC output to the inverter's DC power source.

However, during any period when voltage-clamping does occur, a relatively large amount of power circulates within the electronic ballast means: from the inverter's output, through the LC circuit, and back into the inverter's DC power source by way of the voltage-clamping means.

SUMMARY OF THE INVENTION

Objects of the Invention

An object of the present invention is that of providing control means in a series-resonance-loaded inverter ballast.

This as well as other objects, features and advantages of the present invention will become apparent from the following description and claims.

Brief Description

A self-oscillating two-transistor half-bridge inverter powered from a DC voltage source has a series-tuned high-Q LC circuit connected across its output. A pair of series-connected fluorescent lamps is normally connected across the tank capacitor of the LC circuit, thereby to provide loading therefor. However, when the lamp load is not so connected, the magnitude of the high-frequency current flowing through the LC circuit would tend to increase to destructively high levels. To prevent this from taking place, the 30 kHz high-frequency current is controlled by a negative feedback control circuit operative to manifestly limit the magnitude of this high-frequency current by reducing the forward conduction duty-cycle of each of the two bridge transistors whenever the peak current magnitude exceeds a predetermined level.

More particularly, during normally loaded operation, each of the inverter's two transistors operates with a nearly 50% forward conduction duty-cycle. However, whenever the magnitude of the high-frequency current exceeds a pre-determined level, the control circuit acts to shorten the forward conduction duty-cycle. As a result, with an unloaded series-tuned high-Q LC circuit connected across the inverter's output, the current through the LC circuit builds up to a certain level and remains there, thereby to provide a substantially fixed-magnitude output voltage suitable for properly starting the fluorescent lamps when they are connected. As soon as the lamps ignite, the resulting loading reduces the output voltage, thereby effectively removing the control circuit from involvement in the inverter's operation.

The inverter's self-oscillation is effected by way of positive feedback provided by way of a saturable current transformer for each transistor; and the shortening of each transistor's forward conduction duty-cycle is accomplished by increasing the magnitude of a negative bias against which each saturable current transformer has to work to drive the base of each transistor.

DESCRIPTION OF THE PREFERRED EMBODIMENT

Details of Construction

Figures 1, 2:
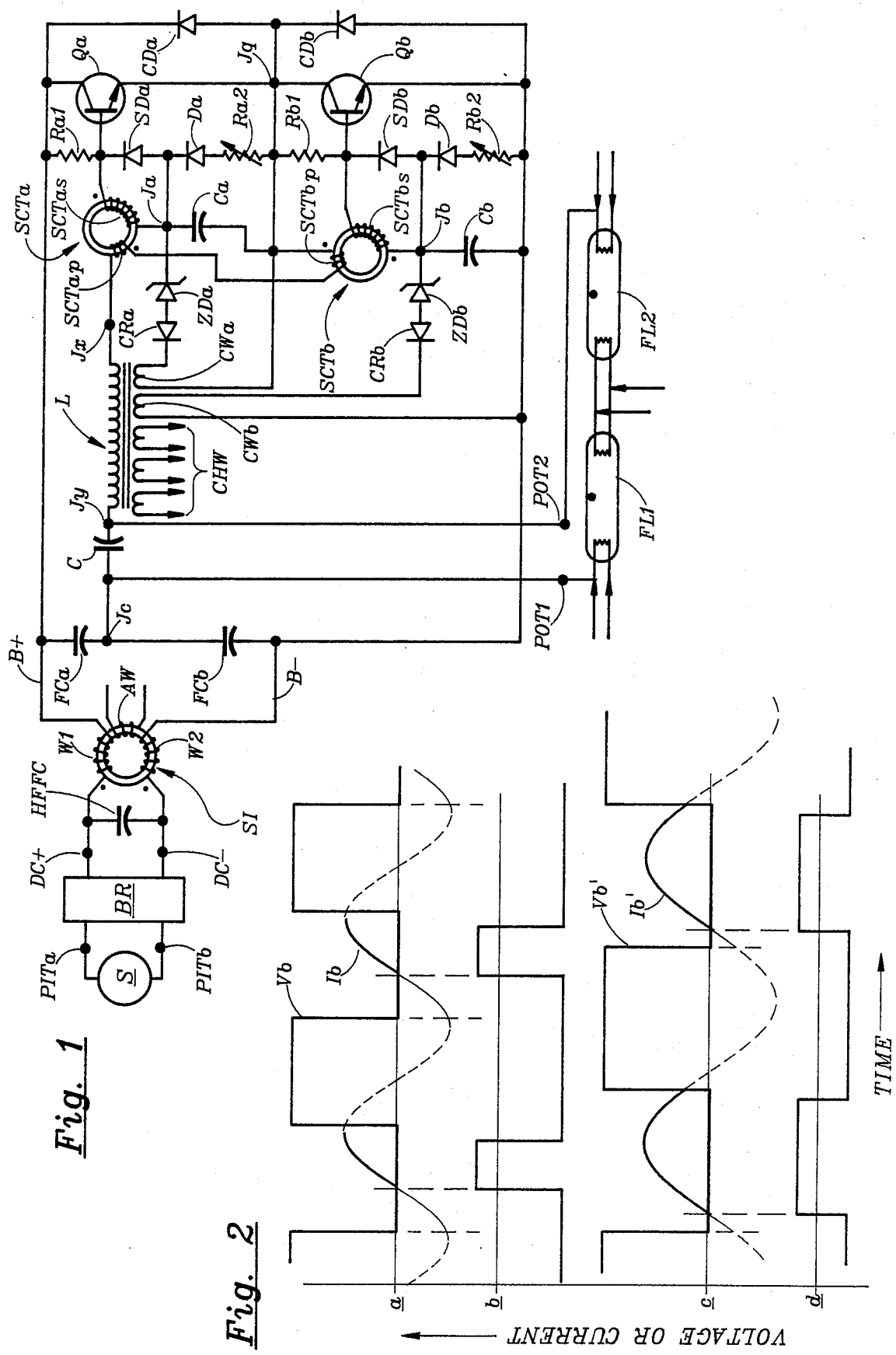
FIG. 1 provides a basic electrical circuit diagram of the preferred embodiment of the invention.
FIG. 2 illustrates waveshapes of various high frequency voltages and currents present within the circuit during different modes of operation.

In FIG. 1, a source S of ordinary 120Volt/60 Hz power line voltage is applied to power input terminals PITa and PITb; which terminals, in turn, are connected with a bridge rectifier BR. The DC output from bridge rectifier BR is applied to a DC+ terminal and a DC− terminal, with the DC+ terminal being of positive polarity. A high-frequency filter capacitor HFFC is connected between the DC+ terminal and the DC− terminal. A first winding W1 of an EMI suppression inductor SI is connected between the DC+ terminal and a B+ bus; and a second winding W2 of EMI suppression inductor SI is connected between the DC− terminal and a B− bus. An auxiliary winding AW is present on EMI suppression inductor SI. A filter capacitor FCa is connected between the B+ bus and a junction Jc; a filter capacitor FCb is connected between junction Jc and the B− bus. A switching transistor Qa is connected with its collector to the B+ bus and with its emitter to a junction Jq; a switching transistor Qb is connected with its collector to junction Jq and with its emitter to the B− bus. A commutating diode CDa is connected between the B+ bus and junction Jq, with its cathode connected with the B+ bus; a commutating diode CDb is similarly connected between junction Jq and the B− bus. A saturable current transformer SCTa has a secondary winding SCTas connected between the base of transistor Qa and a junction Ja; a saturable current transformer SCTb has a secondary winding SCTbs connected between the base of transistor Qb and a junction Jb. Saturable current transformers SCTa and SCTb have primary windings SCTap and SCTbp, respectively; which primary windings are series-connected between junction Jq and a junction Jx. A resistor Ra1 is connected between the collector and the base of transistor Qa; a resistor Rb1 is connected between the collector and the base of transistor Qb. A capacitor Ca is connected between junction Ja and the emitter of transistor Qa; a capacitor Cb is connected between unction Jb and emitter of transistor Qb. A diode Da is connected with its cathode to junction Ja and, by way of an adjustable leakage resistor Ra2, with its anode to the emitter of transistor Qa; a diode Db is connected with its cathode to junction Jb and, by way of an adjustable leakage resistor Rb2, with its anode to the emitter of transistor Qb. A shunt diode SDa is connected between the base of transistor Qa and juncton Ja, with its anode connected with junction Ja; a shunt diode SDb is similarly connected between the base of transistor Qb and junction Jb.

A tank inductor L is connected between junction Jx and a junction Jy; and a tank capacitor C is connected between junctions Jy and Jc. Power output terminals POT1 and POT2 are connected, respectively, with junctions Jc and Jy. First and second fluorescent lamps FL1 and FL2 are series-connected between power output terminals POT1 and POT2.

Tank inductor L has three cathode heater windings CHW; which are connected with the cathodes of fluorescent lamps FL1 and FL2, as well as a first and second control windings CWa and CWb.

Control winding CWa is connected between junction J and the cathode of a first control rectifier CRa, whose anode is connected with the anode of a first control Zener diode ZDa; control winding CWb is connected between the B− bus and the cathode of a second control rectifier CRb, whose anode is connected with the anode of a second control Zener diode ZDb.

Details of Operation

The operation of the half-bridge inverter of FIG. 1 is conventional and is explained in conjunction with FIG. 3 of U.S. Pat. No. 4,307,353 to Nilssen.

For a given magnitude of the DC supply voltage, due to the effect of the high-Q LC circuit, the magnitude of the current provided to the fluorescent lamp load (or to any other load presented to the output) is a sensitive function of the frequency and the waveshape of the inverter's output voltage; which output voltage is a squarewave voltage of controllable frequency and with peak-to-peak magnitude about equal to that of the instantaneous magnitude of the DC voltage present between the B− bus and the B+ bus.

The frequency of the inverter's squarewave output voltage is a sensitive function of the natural resonance frequency of the high-Q LC circuit as well as of the duration of the forward conduction period (i.e., the ON-period) of the two inverter switching transistors; which duration, in turn, is a sensitive function of the saturation characteristics of saturable current transformers SCTa and SCTb as combined with the magnitude of the bias voltages present on capacitors Ca and Cb. That is, the duration of the forward conduction period (the ON-time) of each switching transistor is determined by the volt-second product sustainable by its associated saturable current transformer as well as by the magnitude of the negative bias on capacitors Ca and Cb: the higher the volt-second product available before saturation, the longer the ON-time; the higher the negative bias on the Ca/Cb capacitors, the shorter the ON-time.

In the circuit arrangement of FIG. 1, disregarding the effect of control windings CWa and CWb, the magnitude of the negative voltage on capacitors Ca and Cb is determined by the magnitude of the current provided at the inverter's output; which is to say, the magnitude of the current flowing through the primary windings of saturable current transformers SCTa and SCTb: the higher the magnitude of the inverter's output current, the higher the magnitude of the negative voltage on capacitors Ca and Cb. Thus, disregarding the effect of control windings CWa and CWb, the circuit of FIG. 1 provides for a high degree of automatic regulation of the magnitude of the inverter's output current. By adjusting the resistance value of each of (or even only one of) resistors Ra2 and Rb2, the magnitude of the inverter's output current is adjusted: a relatively low resistance value leads to a current of relatively high magnitude; a relatively high resistance value leads to a current of relatively low magnitude.

More particularly, the higher the magnitude of the inverter's output current, the higher the magnitude of the base current provided to each transistor; and this base current basically has to flow from the bias capacitor (Ca or Cb) associated with each transistor. Thus, a negative voltage will develop on each bias capacitor, and the magnitude of this negative voltage will depend on the magnitude of the base current as well as on the resistance value of the leak-off resistor (Ra2 or Rb2) associated with each bias capacitor.

The higher the magnitude of the negative voltage on each bias capacitor, the higher the magnitude of the voltage that has to be provided from the secondary winding of each saturable current transformer; which, in turn, leads to a correspondingly shorter period before saturation is reached. Thus, as the magnitude of the negative bias on each bias capacitor in increased, the duration of each transistor's forward conduction period (ON-time) is decreased; which, in turn, leads to a reduction in the magnitude of the inverter's output current in comparison with what it otherwise would have been.

Whereas the base current provided to each transistor has to flow from its associated bias capacitor, the reverse or reset current provided from each of the saturable current transformer's secondary windings does not flow from the bias capacitor, but rather flows in a separate path through the reverse shunt diode (SDa or SDb) shunting the secondary winding of each saturable current transformer.

Due to the effect of control windings CWa and CWb and their associated components (i.e., CRa/ZDa & CRb/ZDb, respectively), the actual situation will be somewhat different from that described above. Provided the resistance values of leakage resistors Ra2 and Rb2 are set such as to permit the magnitude of the open circuit voltage across the tank capacitor to grow to a certain relatively high value, a point is reached where the magnitude of the voltage present across tank inductor L gets to be so high as to make the magnitude of the voltage provided at each of control windings CWa and CWb so high as to cause current to flow through the associated control rectifiers (CRa and CRb) and Zener diodes (ZDa and ZDb). When that occurs, the magnitude of the negative bias voltage on bias capacitors Ca and Cb increases, thereby causing a corresponding shortening in the forward conduction period (the ON-time) of each switching transistor. This shortening of ON-time, in turn, causes the magnitude of the voltage developing across the tank inductor (and thereby across tank capacitor C as well) to be limited to a level lower than would have been the case in the absence of such shortening of ON-time.

In particular, the value of the Zenering voltage of Zener diodes ZDa and ZDb—as combined with the number of turns of each control winding, etc.—is so chosen as to cause the magnitude of the voltage developing across tank capacitor C to be limited to a level that is appropriate for properly starting the two series-connected fluorescent lamps. Thus, with the lamps disconnected, the magnitude of the voltage provided across output terminals POT1 and POT2 will be limited to a level that is appropriate for lamp starting.

However, with the lamps connected, after they have started, the magnitude of the voltage across the tank capacitor (or across the POT1/POT2 terminals) will—due to the loading provided by the fluorescent lamps—decrease to a level so low as to make the magnitude of the voltage provided at each control winding too low to cause a control current to flow through the control rectifiers (CRa and CRb).

Thus, after the lamps have started, the effect of the control windings (CWa and CWb) and their associated circuitry (CRa/ZDa & CRb/ZDb) is eliminated; which is to say that the resistance values of each adjustable should be so set as to provide for the desired amount of power to be provided to the fluorescent lamps after they have started.

In other words, by adjusting the r values of resistors Ra2 and Rb2, the amount of light provided by the fluorescent lamps will be correspondingly adjusted; which is to say that adjustable resistors Ra2 and Rb2 constitute a lamp dimming means.

FIG. 2 depicts various voltage and current waveforms associated with the circuit of FIG. 1.

For a situation with no loading presented to the high-Q LC circuit—that is, with the lamps disconnected, or before the lamps have ignited—FIG. 2a shows the collector-to-emitter voltage Vb of transistor Qb and the corresponding inverter output current Ib. The part of Ib actually flowing through transistor Qb in the forward direction is shown in heavy solid line, the part of Ib flowing through commutating diode CDb is showed in light solid line, and the part of Ib flowing through either Qa or CDa is shown in light dashed line.

FIG. 2b shows the base-emitter voltage of transistor Qb as it corresponds to the waveforms of FIG. 2a.

For a situation where the LC circuit is substantially fully loaded by the two fluorescent lamps, FIG. 2c shows the collector-to-emitter voltage Vb' of transistor Qb and the corresponding inverter output current Ib'. The part of Ib' actually flowing through transistor Qb in the forward direction is shown in heavy solid line, the part of Ib' flowing through commutating diode CDb is showed in light solid line, and the part of Ib' flowing through either Qa or CDa is shown in light dashed line.

FIG. 2d shows the base-emitter voltage of transistor Qb as it corresponds to the waveforms of FIG. 2c.

Additional Comments (a) Detailed information relative to a fluorescent lamp ballast wherein the fluorescent lamp is powered by way of a series-excited parallel-loaded L-C resonant circuit is provided in U.S. Pat. No. 4,554,487 to Nilssen.

(b) The instantaneous peak-to-peak magnitude of the squarewave output voltage provided by the half-bridge inverter between junctions Jq and Jc is substantially equal to the instantaneous magnitude of the DC supply voltage.

(c) Saturable current transformers SCTa and SCTb require only a miniscule amount of voltage across their primary windings. Hence, the magnitude of the voltage-drop between junctions Jq & Jx is substantially negligible, and the inverter's full output voltage is therefore effectively provided across the LC circuit, which consists of tank capacitor C and tank inductor L.

(d) In FIG. 2, the inverter frequency associated with the waveforms of FIGS. 2a and 2b is somewhat higher than that associated with FIGS. 2c and 2d.

Correspondingly, current Ib is nearly 90 degrees out of phase with the fundamental frequency component of voltage Vb, while current Ib' is almost in phase with voltage Vb'.

(e) In the situation associated with the waveform of FIG. 2b, the magnitude of the bias voltage on bias capacitor Ca and Cb is about three times higher than it is in the situation associated with the waveform of FIG. 2d.

Correspondingly, the duration of the transistor ON-time in the situation associated with FIG. 2d is almost twice that of the transistor ON-time in the situation associated with the waveform of FIG. 2b.

(f) Auxiliary winding AW on EMI suppression inductor SI serves the purpose of detecting the presence of ground fault current; and, as such, may be used to disable the inverter in case of excessive ground fault current.

(g) As may be noticed in FIG. 2a, transistor Qb ceases to conduct in its forward direction while a substantial amount of current is still flowing in the forward direction. After transistor Qb has ceased to conduct, the forward-flowing current will continue to flow until the energy in the tank inductor has dissipated itself. However, the current will continue its flow through commutating diode CDa, thereby discharging its energy into the DC power supply.

(h) Forward conduction of a transistor is defined as current flowing, with the aid of forward base drive current, directly between the collector and the emitter; which, in case of transistor Qb for, instance, means that forward current is defined as positive current flowing from its collector to its emitter while positive drive current is being provided to its base.

A transistor's ON-time is defined as the period during which it conducts current in the forward direction.

(i) For the situations depicted in FIG. 2, the magnitude of the negative bias voltage is the same on both bias capacitors; which implies that the resistance values of adjustable resistors Ra2 and Rb2 are set to be the same.

However, there is no need for the resistance values of resistors Ra2 and Rb2 to be set to be the same: quite the contrary. A wide range of inverter power output adjustment is in fact attained by way of adjusting only one of the two adjustable resistors.

With the two adjustable resistors set at different resistance values, the durations of the ON-times of the associated transistors will be correspondingly different: the smaller the resistance value of Ra2, the longer the ON-time associated with transistor Qa; the larger the resistance value of Ra2, the shorter the ON-time associated with transistor Qa; the smaller the resistance value of Rb2, the longer the ON-time associated with transistor Qb; and the larger the resistance value of resistor Rb2, the shorter the ON-time associated with transistor Qb.

(j) Also in FIG. 2 it is noted that the fundamental frequency of the waveforms depicted in FIGS. 2c and 2d is somewhat higher than that associated with the waveforms of FIGS. 2a and 2b; yet the indicated duration of transistor ON-time associated with the waveforms of FIGS. 2a and 2b is substantially shorter than the indicated duration of transistor ON-time associated with the waveforms of FIGS. 2c and 2d.

In fact, when the transistor ON-time is shortened by a given proportion, the fundamental frequency of the inverter's output voltage increases by a much smaller proportion.

(k) The time constant associated with each bias capacitor and its associated leakage resistor is normally longer than a complete cycle of the high frequency inverter output voltage, and it is typically on the order of several such complete cycles.

For instance, for a situation where the power line input voltage is 120 Volt/60 Hz, the frequency of the inverter output voltage/current is on the order of 30 kHz, and the total inverter power output falls in the range between 10 and 100 Watt, the values of bias capacitors Ca and Cb might reasonably be in the range from one to ten micro-Farad, and the values for leakage resistors Ra2 and Rb2 might reasonably be in the range between 5 and 250 Ohm.

Thus, in general, the magnitude of the bias voltage on the bias capacitors is responsive to the average magnitude of the inverter's output current—normally as averaged over at least a full cycle of this output current.

(1) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. An arrangement comprising:
   a source of DC voltage;
   inverter means connected with the source of DC voltage and operative to provide an alternating output current from an output, the alternating current having a frequency and a period;
   lamp means connected with the output by way of frequency-responsive circuit means; and
   sensor and control means connected in circuit with the inverter means, the sensor and control means being responsive to the average magnitude of the output current and operative to cause the frequency of the output current to change in response thereto, thereby to correspondingly affect the magnitude of any current provided to the lamp means, the average magnitude of the output current being defined as the absolute magnitude of the output current as averaged over at least one complete period thereof.

2. The arrangement of claim 1 wherein the inverter means is made to function as an inverter by means of positive feedback derived from its output.

3. An arrangement comprising:
   a source of DC voltage;
   inverter means connected with the source of DC voltage and operative to provide an AC voltage at a pair of inverter terminals, the AC voltage having a frequency;
   a high-Q LC tuned circuit series-connected across the inverter terminals, the high-Q LC tuned circuit having a tank capacitor means and a tank inductor means, an inverter current flowing from the inverter terminals and into the high-Q LC circuit, the inverter current having a period, output terminal means being connected in circuit with the tank capacitor means, an output voltage being present across the output terminal means; and
   sensor and control means connected in circuit with the inverter means, the sensor and control means being responsive to the average magnitude of the inverter current and operative to cause the frequency of the AC voltage to change in response to said average magnitude, thereby to correspondingly affect the magnitude of the output voltage, the average magnitude of the inverter current being defined as the absolute magnitude of the inverter current as averaged over at least one complete period thereof.

4. The arrangement of claim 3 wherein: (i) the inverter means comprises transistor means operative, in response to a switching signal, to exist either in a state of conduction or in a state of non-conduction, and (ii) the inverter means is made to function as an inverter by way of providing said switching signal to said transistor means, the switching signal being provided in response to the AC voltage at the inverter terminals.

5. An arrangement comprising:
   a source of DC voltage;
   inverter means having a first and a second transistor means, the first transistor means having a first control input, the second transistor means having a second control input, the inverter means being connected with the DC voltage and operative to provide an AC voltage at an inverter output, the AC voltage having a frequency and a period, the inverter means being made to function as an inverter by providing a switching signal to each of said control inputs;
   high-Q LC tuned circuit means effectively series-connected across the inverter output and operative to draw an output current therefrom, the high-Q LC tuned circuit having a tank capacitor means and being series-resonant at or near the frequency of the AC voltage, an output terminal means being effectively connected in parallel with the tank capacitor means and operative to permit connection with a load means such a gas discharge lamp, there being an output voltage present at the output terminal means; and
   sensing and control means connected in circuit with the inverter output and operative to provide said switching signal to each of said control inputs, thereby to cause each of said transistor means alternatingly and periodically to exist in an ON-state and in an OFF-state, the first transistor means being in its OFF-state whenever the second transistor means is in its ON-state, the second transistor means being in its OFF-state whenever the first transistor means is in its ON-state, the sensing and control means being responsive to the magnitude of the output current and operative by way of controlling the duration of the ON-state of the first transistor means to control the magnitude of the output voltage even when there is no load means connected with the output terminal means.

6. The arrangement of claim 5 wherein the switching signal for each transistor means is derived from the output current by way of current transformer means.

7. The arrangement of claim 5 wherein the frequency of the AC voltage changes with a change in the duration of the ON-state of the first transistor, but to a proportion that is substantially lower than the proportion by which the duration of the ON-state of the first transistor is changed.

8. The arrangement of claim 5 wherein: (i) the output current has a period, (ii) the output current has an average magnitude defined as its absolute magnitude as averaged over said period or longer, and (iii) the sensing and control means is responsive to the average magnitude of the output current.

9. An arrangement comprising:
a source of DC voltage;
inverter means having a first and a second transistor means, the first transistor means having a first control input, the second transistor means having a second control input, the inverter means being connected with the DC voltage and operative to provide an AC voltage at an inverter output, the AC voltage having a frequency and a period, the inverter means being made to function as an inverter by providing a switching signal to each of said control inputs;
high-Q LC tuned circuit means effectively series-connected across the inverter output and operative to draw an output current therefrom, the high-Q LC tuned circuit having a tank capacitor means and being series-resonant at or near the frequency of the AC voltage, an output terminal means being effectively connected in parallel with the tank capacitor means and operative to permit connection with a load means such a gas discharge lamp, there being an output voltage present at the output terminal means; and
sensing and control means connected in circuit with the inverter output and operative to provide said switching signal to each of said control inputs, thereby to cause each of said transistor means alternatingly and periodically to exist in an ON-state and in an OFF-state, the first transistor means being in its OFF-state whenever the second transistor means is in its ON-state, the second transistor means being in its OFF-state whenever the first transistor means is in its ON-state, the sensing and control means being responsive to the magnitude of the output current and operative, by way of controlling the duration of the ON-state of the first transistor means in relationship to the duration of the ON-state of the second transistor means, to control the magnitude of the output current.

10. An arrangement comprising:
a source of DC voltage;
inverter means having a first and a second transistor means, the first transistor means having a first control input, the second transistor means having a second control input, the inverter means being connected with the DC voltage and operative to provide an AC voltage at an inverter output, the AC voltage having a frequency and a period, the inverter means being made to function as an inverter only when each of said control inputs is supplied with a switching signal;
LC tuned circuit means effectively series-connected across the inverter output and operative to draw an output current therefrom, the LC tuned circuit having a tank capacitor means and being series-resonant at or near the frequency of the AC voltage, an output terminal means being effectively connected in parallel with the tank capacitor means, there being an output voltage present at the output terminal means, the LC tuned circuit means having a high Q-factor when unloaded and being operative by way of Q-multiplication to cause the output voltage to have a relatively high magnitude except when appropriate loading is presented to the output terminal means;
load means, such as a gas discharge lamp, connected with the output terminal means and operative to present appropriate loading thereto; and
sensing and control means connected in circuit with the inverter means and operative to provide said switching signal to each of said control inputs, thereby to cause each of said transistor means alternatingly and periodically to exist in an ON-state and in an OFF-state, the first transistor means being in its OFF-state whenever the second transistor means is in its ON-state, the second transistor means being in its OFF-state whenever the first transistor means is in its ON-state, the sensing and control means being responsive to the magnitude of the output current and operative by way of controlling the duration of the ON-state of the first transistor means to control the magnitude of the output current, the sensing and control means being operative to increase the duration of the ON-state of the first transistor means whenever the load means is indeed operative to present said appropriate loading to the output terminal means.

11. The arrangement of claim 10 combined with adjustment means connected with the sensing and control means and operative to permit control of the magnitude of the output current.

12. An arrangement comprising:
a source of DC voltage;
inverter means having a first and a second transistor means, the first transistor means having a first control input, the second transistor means having a second control input, the inverter means being connected with the DC voltage and operative to provide an AC voltage at an inverter output, the AC voltage having a frequency and a period, the inverter means being made to function as an inverter only when each of said control inputs is supplied with a switching signal;
LC tuned circuit means effectively series-connected across the inverter output and operative to draw an output current therefrom, the LC tuned circuit having a tank capacitor means and being series-resonant at or near the frequency of the AC voltage, an output terminal means being effectively connected in parallel with the tank capacitor means, there being an output voltage present at the output terminal means, the AC tuned circuit means having a relatively high Q-factor when unloaded and being operative by way of Q-multiplication to cause the output voltage to have a relatively high magnitude except when appropriate loading is presented to the output terminal means;
load means, such as a gas discharge lamp, conditionally connected with the output terminal means and, when indeed so connected, operative to present appropriate loading thereto; and
sensing and control means connected in circuit with the inverter means and operative to provide said switching signal to each of said control inputs, thereby to cause each of said transistor means alternatingly and periodically to exist in an ON-state and in an OFF-state, the first transistor means being in its OFF-state whenever the second transistor means is in its ON-state, the second transistor means being in its OFF-state whenever the first transistor means is in its ON-state, the sensing and control means being responsive to the magnitude of the output current and operative by way of controlling the duration of the ON-state of the first transistor means to limit the magnitude of the output current such as to prevent said relatively high magnitude from exceeding a pre-determined level even when the load means is not connected with said output terminal means, the pre-determined level being determined by the duration of the ON-state of said first transistor means.

13. The arrangement of claim 12 wherein, whenever the load means is not connected with the output terminal means, the duration of the ON-state of the first transistor means is substantially shorter than said period.

* * * * *